US005913645A

United States Patent [19]

Coffey

[11] Patent Number: 5,913,645

[45] Date of Patent: Jun. 22, 1999

[54] V-BLOCK MOUNTING FOR FIXED-BASE ROUTER WITH DEFLECTION LIMITATION RIB

[75] Inventor: John R. Coffey, New Bern, N.C.

[73] Assignee: S-B Power Tool Company, Chicago, Ill.

[21] Appl. No.: 09/092,667

[22] Filed: Jun. 5, 1998

Related U.S. Application Data

[63] Continuation-in-part of application No. 08/963,917, Nov. 4, 1997.

[51] Int. Cl.[6] .......... B23B 51/00

[52] U.S. Cl. .......... 409/182; 144/136.1; 409/181; 409/204; 409/218

[58] Field of Search .......... 409/182, 181, 409/204, 218, 206; 144/1 F, 136 R, 136 A, 134 A

[56] References Cited

U.S. PATENT DOCUMENTS

| | | | |
|---|---|---|---|
| 4,319,860 | 3/1982 | Beares | 409/182 |
| 4,770,573 | 9/1988 | Monobe | 409/182 |
| 4,938,642 | 7/1990 | Imahashi et al. | 409/182 |
| 5,074,724 | 12/1991 | McCracken | 409/182 |
| 5,088,865 | 2/1992 | Beth et al. | 409/204 |
| 5,094,575 | 3/1992 | Kieser et al. | 409/182 |
| 5,101,875 | 4/1992 | Eckhold et al. | 409/182 |
| 5,117,879 | 6/1992 | Payne | 409/182 |
| 5,139,061 | 8/1992 | Neilson | 409/182 |
| 5,143,494 | 9/1992 | McCurry | 409/182 |
| 5,181,813 | 1/1993 | McCracken | 409/182 |
| 5,188,492 | 2/1993 | McCracken | 409/182 |
| 5,286,147 | 2/1994 | Escobedo et al. | 409/218 |

*Primary Examiner*—Andrea L. Pitts
*Assistant Examiner*—Adesh Bhargava
*Attorney, Agent, or Firm*—Jones, Day, Reavis & Pogue

[57] ABSTRACT

The fixed-base router includes a base assembly and a cylindrical motor housing. The base assembly has a tubular member defining a vertically disposed inner cylindrical surface with two longitudinally extending support ribs. The tubular member has a longitudinal slot or opening between a pair of adjacent inner projections. Only the two ribs and the inner projections engage the cylindrical motor housing when the base tubular member is clamped to the cylindrical motor housing. The two support ribs and the slot are substantially equally spaced from each other. Another set of ribs prevents tilt when the tubular member is in an unclamped condition, and a deflection limitation rib is provided to prevent excessive deflection of the base tubular member when the clamping force is too high.

15 Claims, 4 Drawing Sheets

V-BLOCK MOUNTING FOR FIXED-BASE ROUTER WITH DEFLECTION LIMITATION RIB

REFERENCE TO PRIOR APPLICATION

This application claims the benefit of copending application Ser. No. 08/963,917 filed on Nov. 4, 1997; this application is a continuation-in-part.

BACKGROUND OF THE INVENTION

1. Field of the Invention

The present invention relates to routers. More particularly, the present invention relates to an improved construction for mounting a router motor housing for repeatably precise and accurate concentric positioning relative to the base assembly at any vertical setting.

2. Description of the Related Art

There are basically two types of routers: fixed-base and plunge. A fixed-base router, also known as a standard router, has a base that clamps directly to a removable motor housing making the router one integral or "fixed" unit.

Virtually all fixed-base routers have mechanisms to clamp the motor in the router's base at a designated vertical position. To effect the desired depth of cut (the amount of the router bit projecting through the sub-base), the operator must move the router motor up and down and then clamp the motor to the base at the desired vertical position. In most router applications it is necessary to set the depth of cut accurately and precisely. Further, it is necessary in almost all router applications to maintain the bit as precisely as possible in a perpendicular relationship to the plane of the base and in a concentric relationship to the outside diameter of the base in all vertical positions of the motor.

Router base assemblies typically include an annular base member which rests on the workpiece. The annular base supports an upright, hollow cylinder in concentric relationship therewith. The hollow cylinder has a vertical slot and is associated with a clamping mechanism for opening the base cylinder to receive the cylindrical motor housing freely and for closing or squeezing the cylindrical base cylinder into tight engagement with the cylindrical motor housing. The inside diameter of the base cylinder, in its open or relaxed state, is necessarily greater than the outside diameter of the cylindrical motor housing. When the clamping mechanism is actuated to squeeze the base cylinder into tight frictional engagement with the cylindrical motor housing, the base cylinder will no longer maintain a true circular cross-section. In most cases, the clamped, now non-circular base assembly will engage the cylindrical motor housing at two diametrically opposed, vertical areas of contact. Thus, the motor housing is subject to being canted or cocked slightly with respect to the base cylinder in which event the router bit will not be in a precise perpendicular position with respect to the plane of the annular base member which rests on the workpiece. Accordingly, the resulting cutting operation may not be as precise as the operator expects or would like.

BRIEF DESCRIPTION OF THE INVENTION

The present invention may be summarized as providing an improved mounting construction in the router base assembly for maintaining the router bit in a true perpendicular relationship with the plane of the annular base in all vertical positions of the router motor housing.

A primary object of the present invention is the provision of a cylindrical base member for a router having arcuately spaced, vertically extending support ribs for engaging and locating a cylindrical motor housing and a rib for limiting deflection of the base member.

It is another object of the present invention to provide a mounting construction of the type just referred to wherein the support ribs establish a V-block type of mounting between the cylindrical base member and the cylindrical motor housing and the deflection limitation rib stops deflection of the base after a predetermined movement.

Still a further aim object of the present invention is the provision of a router mounting construction of the type just referred to which is of uncomplicated construction thereby lending itself to low-cost manufacture and reliable operation.

These and other objects, aims and advantages of the invention will become apparent from the following specification.

DESCRIPTION OF A PREFERRED EMBODIMENT

Figure 1:
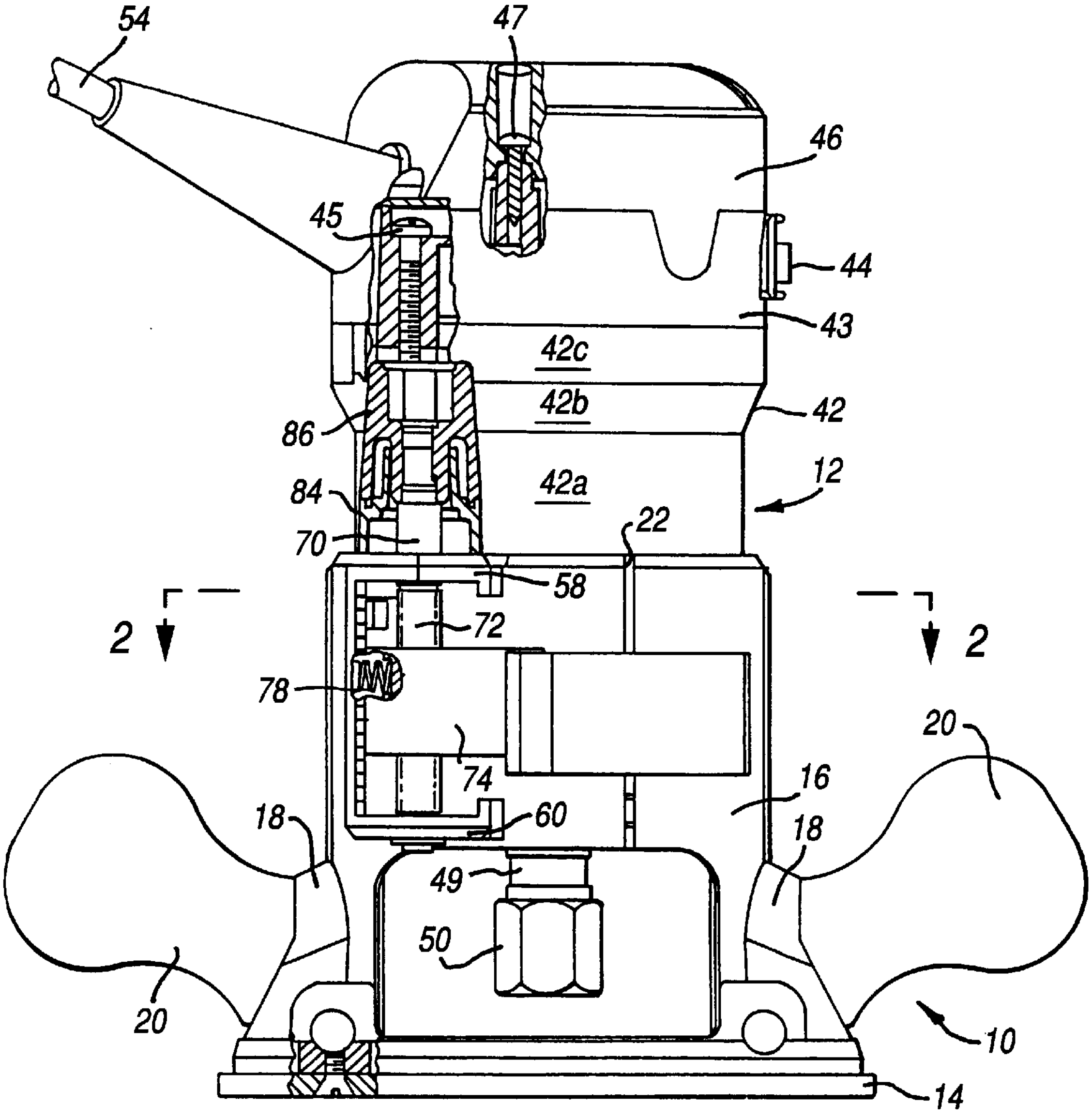
FIG. 1 is a front elevational view of a fixed-base router incorporating the present invention.

While the present invention is open to various modifications and alternative constructions, the preferred embodiment shown in the drawings will be described herein in detail. It is understood, however, that there is no intention to limit the invention to the particular form disclosed. On the contrary, the intention is to cover all modifications, equivalent structures and methods and alternative constructions falling within the spirit and scope of the invention as expressed in the appended claims.

Figure 2:
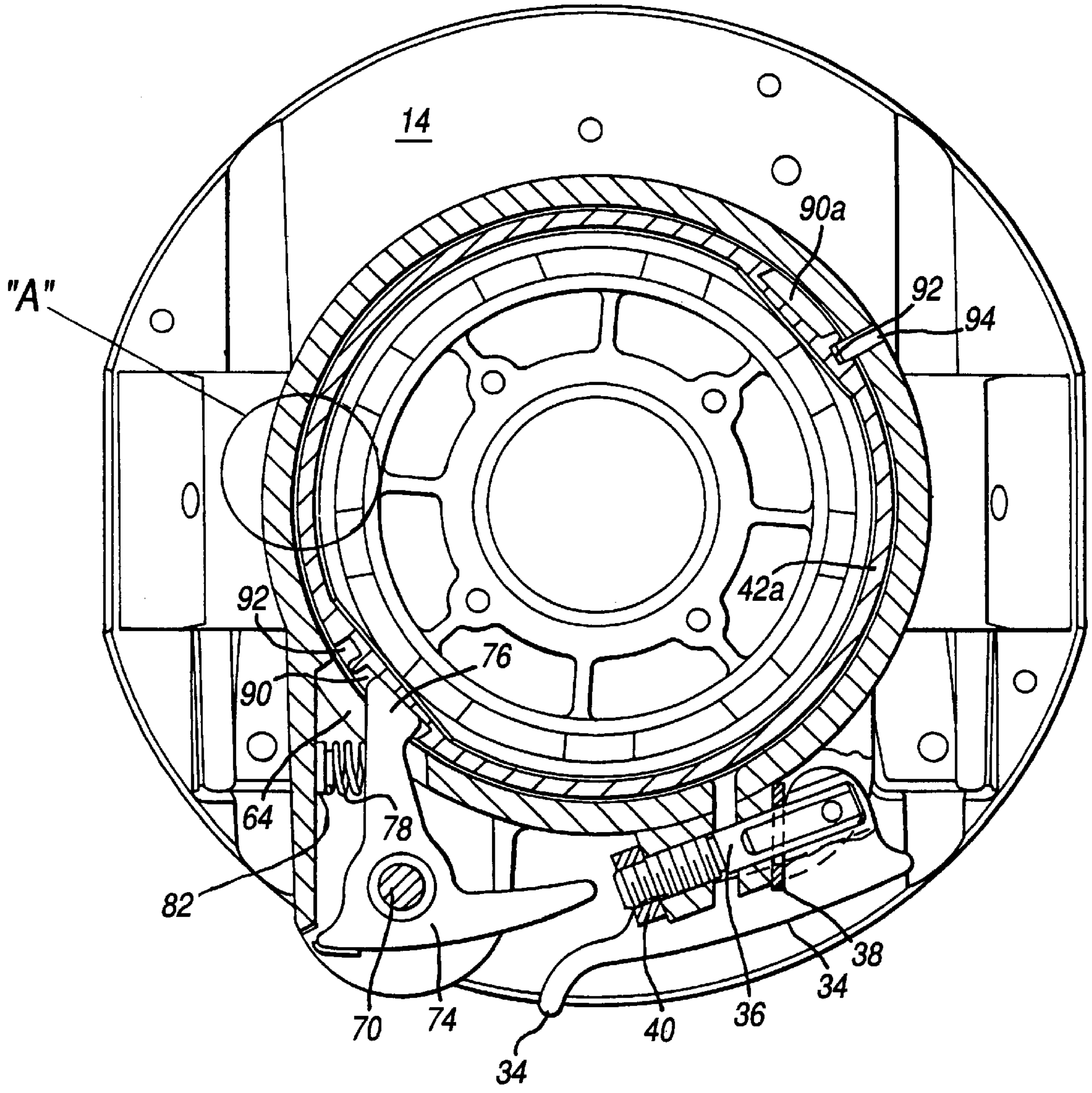
FIG. 2 is an enlarged section taken along the line 2—2 of FIG. 1.
Figure 4:
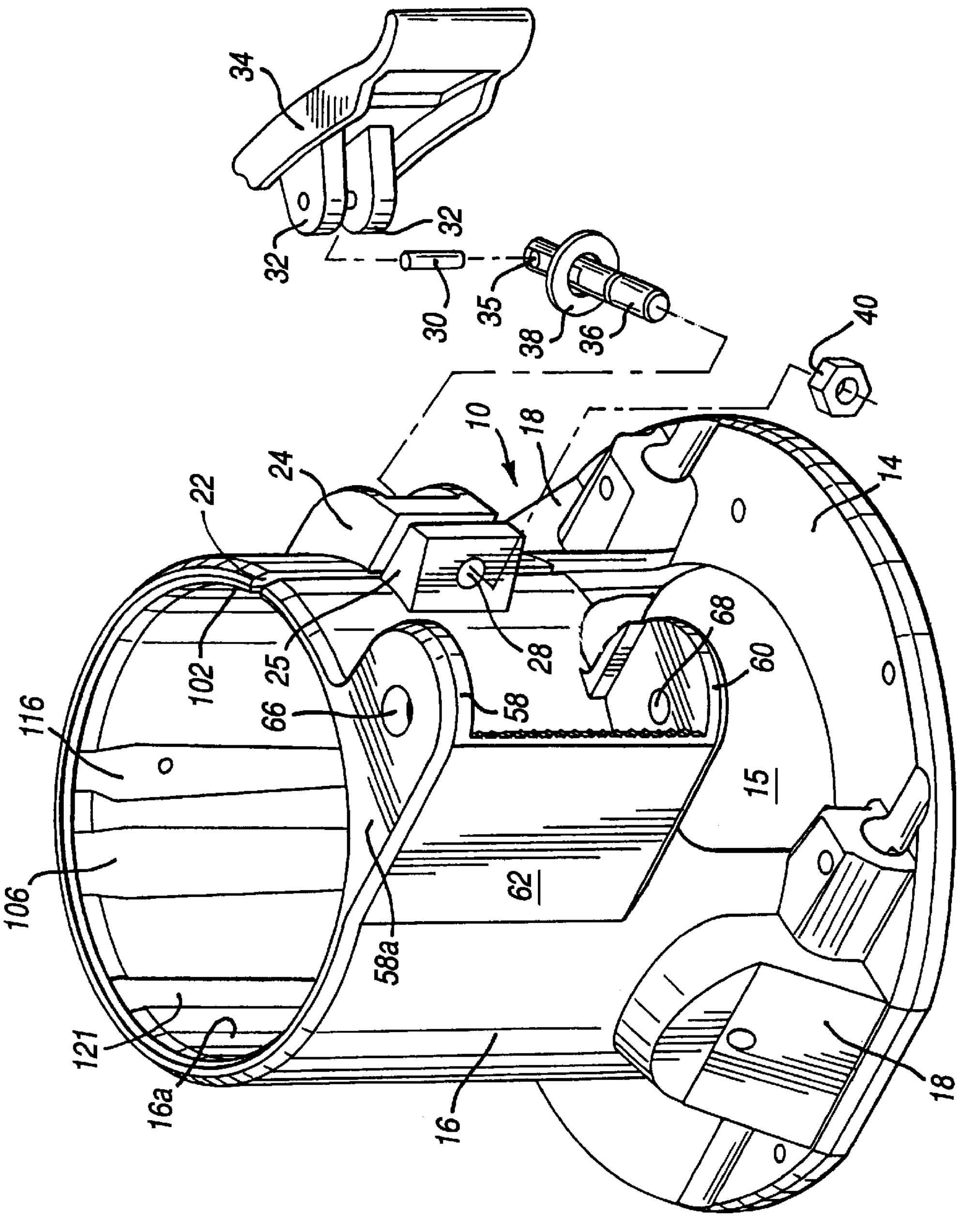
FIG. 4 is an exploded isometric of the base assembly.

Referring primarily to FIGS. 1 and 2, a router embodying the present invention includes a base assembly, generally designated 10, and a motor assembly, generally designated 12. The base assembly 10 includes a generally annular base member 14 having an opening 15 (FIG. 4). The base assembly includes a cylindrical or tubular base member 16 supported by the annular sub-base member 14 in concentric relationship therewith. The cylindrical base member 16 includes diametrically disposed mountings 18 supporting the usual handles 20 (the handles are shown only in FIG. 1).

Figure 3:
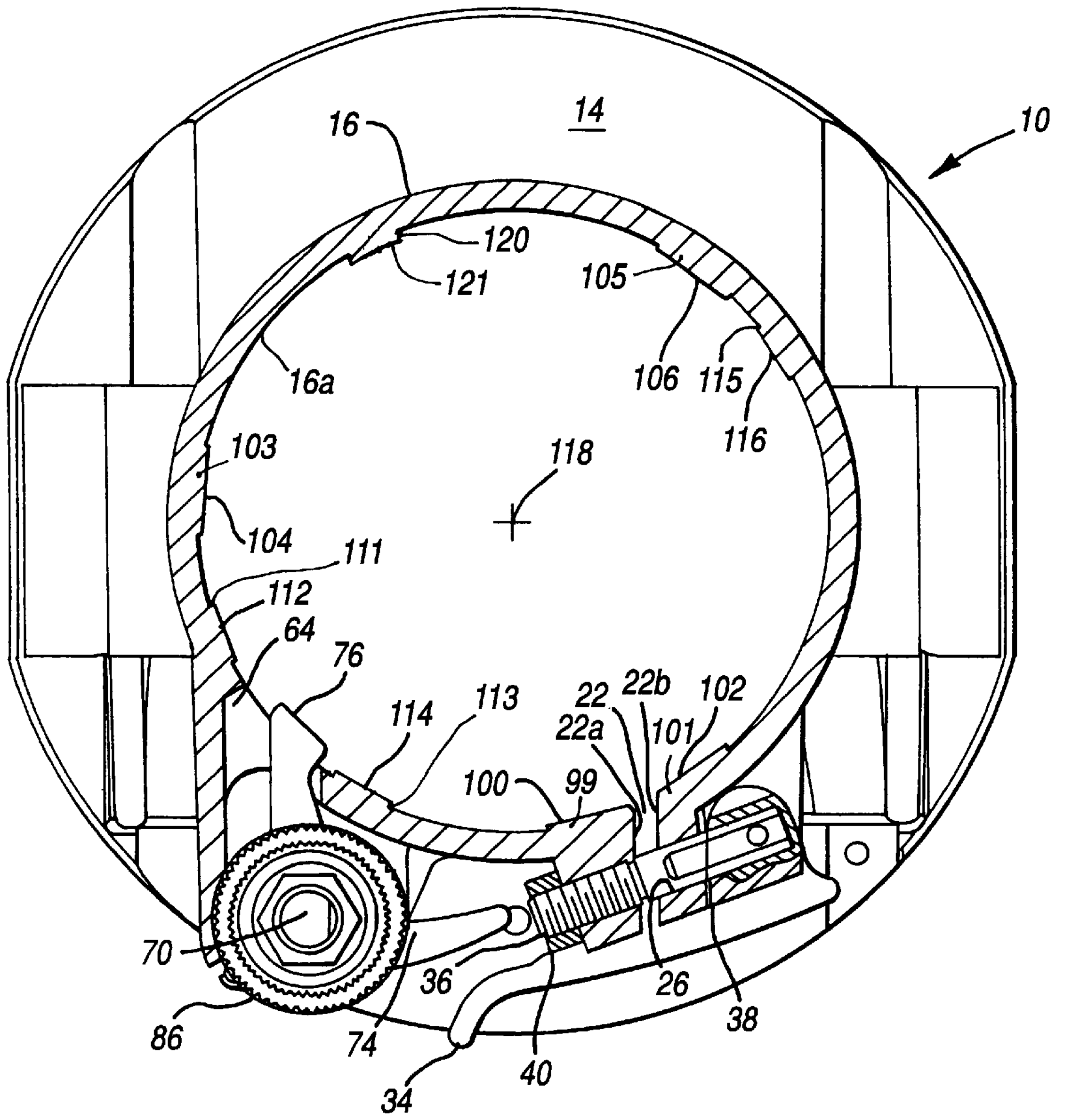
FIG. 3 is a section similar to FIG. 2 but showing only the base assembly.

Referring particularly to FIGS. 3 and 4, it is seen that the cylindrical base member 16 has a longitudinally extending slot or opening 22. Adjacent this slot, the cylindrical member 16 mounts clamp support members 24 and 25 having respective aligned bores 26 and 28. A pin 30 is captured between ears 32 integral with an over-center clamp lever 34. The pin 30 is received within an aperture 35 formed in one end of an adjusting screw 36. The screw 36 is adapted to receive a washer 38 and a nut 40. The adjusting screw 36 is received within the bores 26, 28 of the support members 24, 25 as seen in FIGS. 2 and 3. It is apparent that the clamp lever 34 may be actuated for compressing the opening 22 or for squeezing the cylindrical base member 16 into snug engagement with the motor housing 42. Also, the lever 34 may be released to expand the opening and to permit easy movement of the motor housing in the base assembly.

The motor assembly 12 includes a hollow motor housing 42 having a cylindrical portion 42*a* having an exterior surface 51 joining with a frusto-conical portion 42*b* which in turn joins with an enlarged, concentric annular formation 42*c*. The motor assembly 12 also includes a cylindrical part 43 mounting a rocker switch 44. The part 43 is connected to the part 42 by suitable fasteners (one such fastener is shown in FIG. 1 and designated 45). Also, the motor assembly 12 includes a cover 46. The cover is detachably connected to the part 43 by a plurality of fasteners (one such fastener is illustrated and designated 47). The motor housing 42 is adapted to receive an electric motor (not shown) having an output shaft 49 mounting a collet 50. It will be understood that the collet 50 is adapted to mount a suitable router bit (not shown) which projects through the opening 15 of the base member 14 for engagement with the work. The motor is preferably electric and includes the usual cord 54. The motor is actuated by the rocker switch 44. Other types of motors may be provided, such as a pneumatic motor.

The cylinder 16 of the base assembly 10 includes integral opposed lugs 58 and 60 joined by a wall 62 adjacent a rectangular aperture 64 (FIGS. 2 and 3) formed in the cylinder 16. Lugs 58 and 60 include respective, vertically aligned apertures 66 and 68 rotatably receiving opposite ends of a vertical adjustment rod 70. The rod 70 includes an external threaded formation 72 received within a threaded bore formed in an adjustment lever 74. The lever 74 includes an integral latch formation 76. A spring 78 has one end thereof received within a blind bore (FIG. 1) formed in the lever 74. The other end of the spring 78 engages a shoulder washer 82 (FIG. 2) which abuts the inside surface of the wall 62 thereby biasing the latch 76 to extend through the aperture 64.

The rod 70 mounts an indicator ring 84 and a knob 86. The knob 86 and indicator ring 84 are mounted to the rod 70 for rotation therewith. The indicator ring 84 and the upper surface 58*a* of the lug 58 may be provided with suitable indicia in the nature of a scale to indicate the rotary position of the rod 70. It will be apparent that rotation of the rod 70, by actuation of the knob 86, will cause vertical movement of the adjustment lever 74 upwardly or downwardly depending on the direction of rotation of the rod 70.

It will be understood that the cylindrical member 42*a* of the motor housing 42 includes three vertically aligned positioning notches. (One such notch 90 is shown in FIG. 2.) Each notch 90 is adapted to receive the latch 76 of the adjustment lever 74. Of course, any desired number of such vertically aligned notches or formations may be provided. The notches may be in the form of recesses in the cylinder 42*a* or in the form of openings through the cylinder 42*a*. Preferably, the cylinder 42*a* is provided with three additional vertically aligned notches diametrically oppositely disposed to the notches 90. One such notch 90*a* is shown in FIG. 2. Thus, the motor assembly 12 may be received within the base assembly in either of two rotary positions. As seen in FIG. 2, the cylinder 42*a* is provided with two diametrically oppositely disposed, external recesses 92 each adapted to receive an alignment pin 94 mounted in the base cylinder 16. Engagement of one of the recesses 92 with the pin 94 will ensure that the notches 90 or 90*a* are in rotary alignment with the latch 76.

To adjust the motor and motor housing to the desired vertical position, the operator will release the over-center clamp 34 and slide the motor assembly 12 vertically to position a selected notch 90 or 90*a* in horizontal alignment with the latch 76 of the adjustment lever 74. Release of the adjustment lever 74 will permit the spring 78 to force the latch 76 into the selected notch 90 or 90*a*. Engagement of the latch 76 with one of the selected notches provides a coarse vertical adjustment.

After the latch 76 has been engaged with the selected notch 90 or 90*a*, the operator will rotate the knob 86 in one direction or the other to rotate the rod 70 and thus move the adjustment lever 74 vertically upwardly or downwardly depending on the direction of rotation of the rod 70. This movement of the adjustment lever will cause corresponding movement of the motor assembly 12 for establishing fine vertical adjustment of the motor and motor housing. The vertical adjustment mechanism is disclosed and claimed in application Ser. No. 08/963,918, filed Nov. 4, 1997, Attorney Docket No. 950801, and assigned to the assignee of the present application. The disclosure of that application is incorporated herein by reference. After the desired vertical position has been achieved by operation of the knob 86, the clamp 34 will be actuated to secure the motor assembly 12 to the base assembly 10.

As seen in FIG. 3, the slot 22 defines spaced, axially extending faces 22*a* and 22*b*. The clamping mechanism is shown in its clamped position in both FIGS. 2 and 3. In the clamped position, the faces 22*a* and 22*b* will be spaced apart a distance determined by the position of the nut 40 on the screw 36. Stated another way, in the clamped position, the slot or opening is compressed. The nut 40 provides a means to adjust the frictional engagement between the cylindrical base member 16 and the cylindrical motor housing 42. When the clamping lever 34 is moved to the unclamped position, cylinder 16 will expand to its relaxed circular state whereupon the faces 22*a* and 22*b* will be spaced from each other at a distance greater than the distance between these two faces when in the clamped position shown in FIGS. 2 and 3. Stated another way, the slot or opening is expanded when in the unclamped position. The inside diameter of the cylinder 16 when in its relaxed or unclamped configuration is slightly greater than the outside diameter of the cylindrical motor housing 42.

As best seen in FIG. 3, the cylinder 16 includes a longitudinally extending support rib 99 adjacent the face 22*a* defining planar support surface 100. Cylinder 16 also includes a longitudinally extending support rib 101 adjacent the face 22*b* defining a further planar support surface 102. Cylinder 16 includes another support rib 103 defining a further flat support surface 104. A final planar support surface 106 is defined by an inwardly extending support rib 105 formed on the cylinder 16. The support surfaces 104 and 106 are spaced at approximately 120° from each other. The slot 22 is approximately equidistant from the support surfaces 104 and 106 and thus the two surfaces 100 and 102 are also approximately equidistant from the surfaces 104 and 106. If the two surfaces 100 and 102 are considered to be a single surface, then a 3-point system is created where the support surfaces are very roughly 120° apart from one another.

Figure 5:
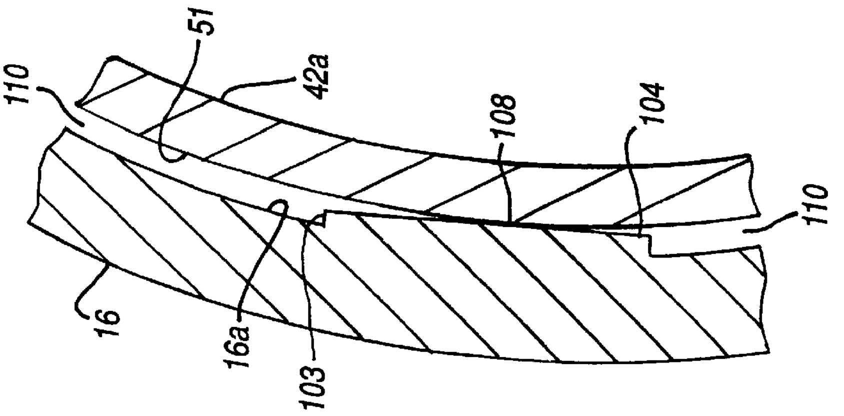
FIG. 5 is an enlarged view of detail "A" of FIG. 2.

When the motor housing 42 is received within the cylinder 16 and when the clamping mechanism is moved to its clamped position, the planar surfaces 100, 102, 104 and 106 will engage the exterior surface 51 of the cylindrical motor portion 42*a*. Planar surfaces 100, 102, 104 and 106 establish tangential contact with the cylindrical motor part 42*a*. In this respect, attention is invited to FIG. 5 showing the cylindrical motor member 42*a* in engagement with the planar surface 104 of the rib 103 when the clamping lever 34 is in its clamped position. The tangential contact between the cylinder 42*a* and the planar support surface 104 establishes a longitudinally extending area of contact 108. The only areas of contact between the cylinder 16 of the base assembly and the cylindrical motor member 42*a* when in the clamped position will be those established by the four planar support surfaces 100, 102, 104 and 106. The other three planar support surfaces will also provide tangential areas of contact.

The axially extending support ribs all define arcuate open spaces 110, FIG. 5, between the inner surface 16*a* of the cylinder 16 and the exterior surface 51 of the motor housing cylinder 42*a*.

The support surfaces 104 and 106 establish a "V" formation thus constituting a V-block form of mounting for the cylindrical motor housing. The support surfaces 100 and 102 serve only to press and secure the cylinder 42*a* of the motor housing 12 against the "V" formed by support surfaces 104 and 106. This mounting assures that the motor housing will not become cocked or canted when it is being clamped in the base assembly as it could be if the internal surface 16*a* were only cylindrical, i.e., if the cylindrical surface 16*a* did not include the various planar support surfaces. Accordingly, the router bit will be maintained in a precise perpendicular position to the plane of the annular base member 14 in all vertical positions of the motor assembly. Further, concentricity of the collet 50 will be maintained in all vertical positions of the motor assembly 12 because the motor is prevented from rotating within the base during vertical positioning by reason of the engagement of the pin 94 with one of the recesses 92. If it were necessary to rotate the motor housing to achieve vertical adjustment, as is the case with many prior art designs, any eccentricity of the collet with respect to the motor housing would introduce errors upon rotation of the motor housing.

It will be noted in FIG. 3 that the cylinder 16 includes additional inwardly extending ribs 111, 113 and 115, called tilt prevention ribs, forming further planar support surfaces 112, 114 and 116, respectively. These support surfaces do not contact the exterior surface of the motor housing 42 when the clamping mechanism is in its clamped position. This is so because the distance of each of the planar surfaces 112, 114 and 116 from the longitudinal central axis 118 of the cylinder 16 is greater than the distance of each of the planar surfaces 100, 102, 104 and 106 from the axis 118. The additional support surfaces are provided to support the motor housing when the clamping mechanism is in its unclamped position. In this regard, when the lever 34 is swung to its unclamped position (counterclockwise as shown in FIGS. 2 and 3), the motor housing will be restrained from vertical movement only by engagement of the latch 76 in one of the notches 90 or 90*a*. Thus, in the unclamped position, the motor housing tends to cant, cock or tilt. Engagement between the cylinder 42*a* and one or more of the support surfaces 100, 102, 104, 106, 112, 114 and 116 tends to minimize the amount of canting of the motor housing when the clamping mechanism is in its unclamped position.

A deflection limitation rib 120, which also has a planar support surface 121, is positioned on the cylinder 16 approximately midway from the two support ribs 103 and 105. The planar surface 121 is, like the surfaces 112, 114 and 116, at a greater distance from the longitudinal central axis 118 than the planar surfaces 100, 102, 104 and 106. The planar surface 121 serves an important function should the clamp be adjusted for excessive clamping force. The section of the cylinder 16 between the support ribs 103 and 105 may distort or deflect inwardly under the excessive clamping force causing the motor housing 42 and the base assembly 10 to fall out of the concentric relationship they were suppose to maintain. The addition of the deflection limitation rib 120 with its planar surface controls the amount of allowed deflection of the cylinder 16 and hence the concentricity between the cylinder 16 and the motor housing 42 is maintained within acceptable limits.

The specification describes in detail an embodiment of the present invention. Other modifications and variations will, under the doctrine of equivalents, come within the scope of the appended claims. For example, the exact spatial relationship of the ribs may change slightly as may the depth of each rib, i.e., the distance from the longitudinal central axis 118 to the rib's planar surface. These changes are considered equivalent structures. Still other alternatives will also be equivalent as will many new technologies. There is no desire or intention here to limit in any way the application of the doctrine of equivalents.

I claim:

1. A fixed-base router comprising:

a base assembly including a first annular base member mounting a second vertically disposed base member, said second base member including at least two, horizontally spaced, vertically extending support ribs, at least one clamping surface substantially equally spaced from each of said support ribs and a deflection limitation rib spaced between said support ribs and generally equidistant from each of said support ribs; and a motor housing having a vertically disposed, cylindrical exterior surface, said motor housing being mounted by said base assembly with said support ribs and said clamping surface in engagement with said exterior surface, said support ribs and said clamping surface establishing the only areas of supporting engagement between the base assembly and said motor housing until and unless said second base member deflects sufficiently to cause contact between said cylindrical exterior surface and said deflection limitation rib.

2. A fixed-base router comprising:

a base including a bottom base member for contacting a work piece and a tubular member connected to said bottom base member and extending away therefrom;

said tubular member having an inner surface and a longitudinally extending opening;

three support ribs connected to said inner surface of said tubular member, said support ribs being spaced approximately equidistant from one another;

a tilt prevention rib connected to said inner surface of said tubular member, said tilt prevention rib being spaced from said support ribs;

a deflection limitation rib connected to said inner surface of said tubular member, said deflection limitation rib being spaced from said tilt prevention rib and being located between two of said support ribs and approximately equidistant from each;

a motor housing having an outer cylindrical surface with a dimension less than said inner surface of said tubular member, said housing being received by said tubular member in a telescoping manner;

a clamp mounted to said tubular member movable from an unclamped position where said opening of said tubular member is extended and a clamped position where said opening of said tubular member is compressed, wherein when said clamp is in an unclamped position, said motor housing is supported by one or more of said support ribs and said tilt prevention rib and when said clamp is in a clamped position, said motor housing is supported only by said support ribs unless said tubular member deflects sufficiently whereby said housing is in contact with said deflection limitation rib.

3. An apparatus as claimed in claim 2 wherein:

one of said support ribs is divided by said opening.

4. An apparatus as claimed in claim 2 wherein:

there are three tilt prevention ribs connected to said inner surface of said tubular member.

5. An apparatus as claimed in claim 4 wherein:

said tilt prevention ribs are spaced from said support ribs.

6. An apparatus as claimed in claim 3 wherein:

said deflection limitation rib is generally opposite said support rib that is divided by said opening.

7. An apparatus as claimed in claim 2 wherein:

a section of said tubular member between two of said support ribs deflects inwardly when said clamp is in a clamped position.

8. An apparatus as claimed in claim 7 wherein:

said deflection limitation rib is connected to said deflecting section of said tubular member for bearing against said motor housing after a predetermined deflection.

9. An apparatus as claimed in claim 8 wherein:

said deflection limitation rib is located approximately equidistant from the two support ribs bordering said deflection section of said tubular member.

10. An apparatus as claimed in claim 9 wherein:

said deflection limitation rib has a lesser radial dimension than said support ribs.

11. A fixed-base router comprising:

a base assembly including a tubular base member;

said tubular base member having an inner surface and a longitudinally extended opening;

three support ribs connected to said inner surface of said tubular base member, said support ribs being spaced approximately equidistant from one another;

a tilt prevention rib connected to said inner surface of said tubular base member;

a deflection limitation rib connected to said inner surface of said tubular base member, said deflection limitation rib being located between two of said support ribs and approximately equidistant from each;

a tubular motor housing having an outer surface with a circumferenial dimension less than the circumferenial dimension of said inner surface of said tubular base member, said housing being received by said tubular base member in a telescoping manner;

a clamp mounted to said tubular base member for tightening said tubular base member about said motor housing wherein said housing is supported only by said support ribs.

12. An apparatus as claimed in claim 11 wherein:

a section of said tubular base member between two of support ribs deflects inwardly when said clamp is tightened.

13. An apparatus as claimed in claim 12 wherein:

said deflection limitation rib is connected to said deflecting section of said tubular base member for bearing against said motor housing after a predetermined amount of deflection.

14. An apparatus as claimed in claim 13 wherein:

said deflection limitation rib is located approximately equidistant from the two support ribs bordering said deflection section of said tubular base member.

15. An apparatus as claimed in claim 14 wherein:

said deflection limitation rib has a lesser radial dimension than said support ribs.

* * * * *